Figure 1:
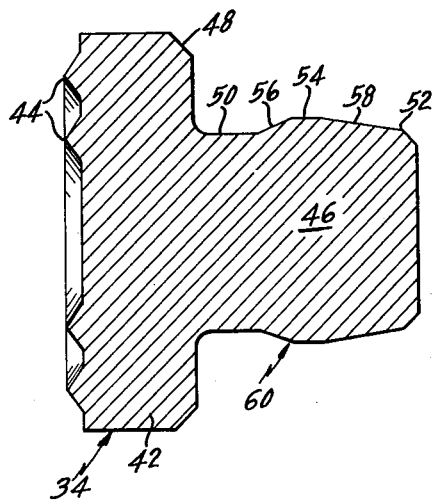

Jan. 22, 1963  E. M. GARDNER  3,074,753
LIFTING CLAMPS AND GRIPPING PADS THEREFOR
Filed July 21, 1960

INVENTOR.
EDWARD MERRILL GARDNER
BY
ATTORNEYS

United States Patent Office 3,074,753
Patented Jan. 22, 1963

3,074,753
LIFTING CLAMPS AND GRIPPING PADS THEREFOR
Edward Merrill Gardner, Flushing, N.Y., assignor to Merrill Brothers, a corporation of New York
Filed July 21, 1960, Ser. No. 44,362
5 Claims. (Cl. 294—104)

This invention relates to improvements in lifting clamps and the like devices which include a gripping pad for holding a steel plate or other heavy object to be gripped and lifted. More particularly, the invention relates to an improved gripping pad for such clamps and to a combined structure including the gripping pad.

The gripping pads of lifting clamps and similar devices are usually held in place in the clamp with a bolt and lock nut which sometimes comes loose or some other securing means, such as a rivet which is difficult to assemble and also to remove.

The primary object of the present invention is to provide an improved gripping pad for use as the original pad in a clamp or for replacing a worn pad.

A further object of the invention is to provide a gripping pad in one piece which is automatically held in the clamp but which is readily removable.

Another object of the invention is to provide a readily insertable gripping pad which cooperates with the clamp structure to hold it firmly in place.

The improved gripping pad according to the invention includes a head of conventional type provided with a hard serrated gripping face, a shank integral with and projecting from the back of the head for insertion in a bore in the clamp, the shank including a knob intermediate its ends having an area of maximum diameter somewhat greater than the diameter of the bore in the clamp. This improved gripping pad is adapted to be driven into the bore in the clamp to a position for simultaneously seating the head of the pad and locking the knob in the bore of the clamp. According to a preferred construction, the improved gripping pad cooperates with a clamp body structure comprising a pair of similarly-shaped plates riveted together face to face, the plates being spread by the shank of the gripping pad so that they act to hold the gripping pad firmly in place.

The improvements of the present invention are described hereinafter in detail in connection with the accompanying drawings illustrating one embodiment of the invention.

Figure 2:
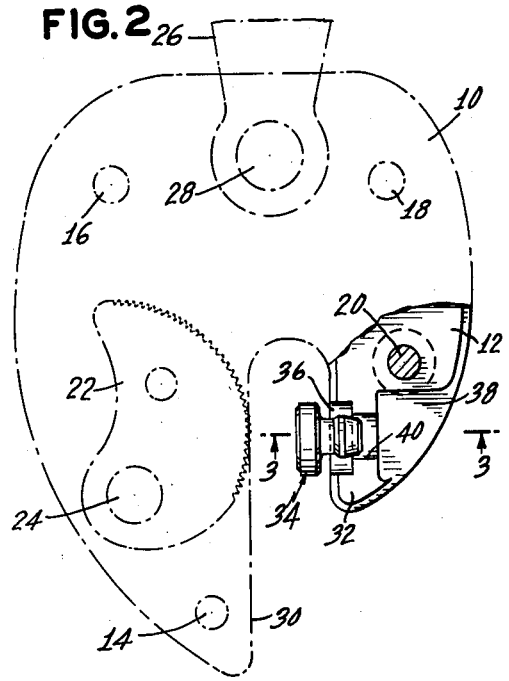
Figure 3:
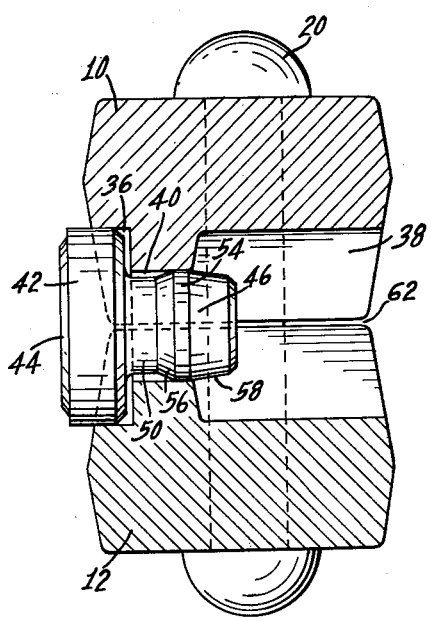
Figure 4:
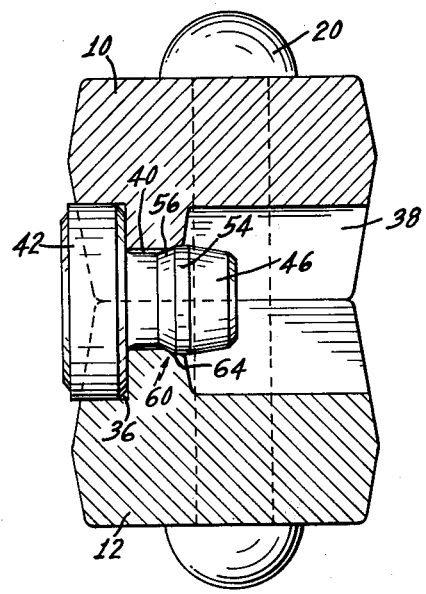

Referring to the drawings:

FIG. 1 is a vertical sectional view through a gripping pad constructed in accordance with the present invention;

FIG. 2 comprises a side elevational view in which the features of the present invention are shown in connection with a diagrammatically illustrated lifting clamp. In FIG. 2 the general outline of the clamp is shown in dot-and-dash lines, while the particular parts to which the invention relates are shown in the lower broken portion of the view, the gripping pad being in its initial position before being driven into the body of the clamp;

FIG. 3 is a horizontal sectional view through the lower portion of the clamp, taken on the line 3—3 of FIG. 2, and showing the gripping pad with the knob on its shank partway through the bore in the clamp; and FIG. 4 is a view similar to that of FIG. 3 showing the gripping pad with its head seated in the counterbore of the clamp and the automatic locking structure associated with the knob of the shank of the pad.

Clamps of the type to which the invention relates are illustrated in FIG. 2 of the drawings in outline form. The body of such clamps, as illustrated, comprises forged side plates 10 and 12 of the same shape which are riveted together by rivets 14, 16, 18 and 20. Certain areas of the plates are spaced by making the plates thinner at those parts, for example, the area housing the gripping cam 22 which is pivoted on a pin 24, and the area receiving the lifting shackle 26 which is pivoted on a pin 28.

The clamp illustrated by way of example in FIG. 2 comprises a jaw 30 in which the gripping cam 22 operates and a shorter jaw 32 in which a gripping pad is mounted facing the cam 22. The plates 10 and 12 over the area of the jaw 32 and the rivets 18 and 20 have the same full thickness so that when they are riveted together by the rivets 18 and 20, their inner surfaces engage each other. A gripping pad 34 is shown in FIG. 2 ready to be inserted in the jaw 32. A gripping pad 34 is shown in FIG. 2 in position ready to be driven into a bore in the jaw 32. The driving may be conveniently accomplished by removing the pin 24 and cam 22 and inserting a set or punch between the plates of the clamp and hitting the end of the set projecting from the left side of the clamp with a hand hammer.

The jaw 32 of the clamp is provided with a cylindrical front counterbore 36 in which the head of the gripping pad fits and is seated, and a back cavity 38 approximately concentric with the counterbore 36. The counterbore and cavity are centered on the interface between the plates and connected by a relatively smaller concentric bore 40 for receiving the shank of the gripping pad. The depth of the cylindrical counterbore 36 is adjusted to the thickness of the head of the gripping pad, while the depth of the cavity 38 is adjusted to leave the bore 40 of a sufficient length for supporting the shank of the gripping pad. The diameter of the cavity 38 is merely sufficient to provide a working space for use in driving out the gripping pad 34 when it becomes worn.

Gripping pads according to the structure shown in FIG. 1 are made in particular sizes with heads and shanks of particular dimensions for use in particular lifting clamps or similar devices. The gripping pad 34 shown in FIG. 1 is of surface hardened steel and includes a cylindrical head 42, the face of which is provided with concentric sharp projecting ridges or serrations 44 for gripping purposes. The pad also includes an integral projecting shank 46. The head may be chamfered at 48. The important feature of the gripping pad structure is the shank 46 which is made for a bore or hole 40 having a specific length and diameter. Accordingly, the tang of the shank 46 along the area 50 has a substantially uniform diameter somewhat less than that of the bore 40. The diameter at the position 52 is also somewhat less than the bore 40, while the diameter of the narrow band area at 54 is somewhat greater than the diameter of the bore 40. The band 54 has a uniform diameter connected to the area 50 by a sloping or tapering section 56, and to the point 52 by a relatively long sloping or tapering section 58.

The band 50 and sloping sections 56 and 58 form a knob or bulge 60 on the shank 46 which cooperates with plates 10 and 12 and the bore 40 to hold the gripping pad in position in the clamp body. In FIG. 2 the gripping pad 34 is shown in its initial position as it is being inserted into the clamp body. The shank freely starts into the bore 40 because of the taper 58, since the end at 52 is of smaller diameter than the bore 40. FIG. 3 shows the position of the gripping pad, its head 42 and its shank 46 after it has been partly driven into the body of the clamp. The pad is driven by means of a hand hammer and a soft metal or mild steel rod as a set in the manner described above. The taper or wedging angle provided along the section 58 permits the pad to be readily driven into the body of the clamp, particularly if a little grease or oil is applied to the pin or bore. Since the diameter of the bulge 60 is greater than that of the bore 40 in the body of the clamp, the driving of the pad from the position shown in FIG. 2 to the position shown in FIG. 3 causes the rivet 20 to stretch and the side plates 10 and 12 to separate or open up slightly as indicated by the space 62, to enlarge the bore 40 at right angles to the parting line of the plates.

FIG. 4 of the drawings shows the gripping pad as completely driven into the body of the clamp. In this position the bulge on the shank has a small portion of its maximum diameter, that is, of the area 54, remaining in the hole 40 when the pad is seated. The proportion of the area 54 which remains in contact with the inner area of the hole 40 is about 10% of the area of the stretched rivet 20, and, therefore, the wall of the hole at its end is crushed, as indicated at 64. The side plates 10 and 12 of the clamp are relatively soft steel plates, while the gripping pad is of hardened steel. When the last small part of the area 54 reaches the inner rim portion of the hole 40, the material of the plates is crushed by the pressure applied by the rivet 20.

The shank 46 of the gripping pad is hard and will not crush, but the edge portions of the hole 40 are crushed to form a tight pressure fit from the under surface of the bulge. The result is a firmly held pad held by the tension of the rivet 20, with no looseness. As the marginal area or rim edge of the hole 40 is crushed in the manner shown in FIG. 4, the side plates 10 and 12 move together until their inner faces meet.

While gripping pads are made in different sizes for different lifting clamps adapted to handle different weights, the end of the pin or shank 46, as shown in FIG. 2, is 0.020" less in diameter than that of the hole 40, so that it freely starts in the hole. The diameter of the pin at the bulge, that is, the area 54, is 0.030" larger than the hole 40. Therefore, the rivets must stretch and the side plates open up, so that the hole is enlarged at right angles to the parting line between the plates as shown in FIG. 3. The area 54 for most gripping pads can be 1/16" wide and about one-half or less of this remains in the hole 40 when the head of the pad is seated.

Gripping pads for lifting clamps of different size have different dimensions. For example, a one-half ton clamp with a bore 40 having a diameter of 24/64 is provided with a gripping pad having a head 3/4" in diameter, a diameter at 54 of 0.420" and at 50 and 52 of 0.370". The taper along the slope 58 was approximately 10°. The head was 1/4" thick and the shank 7/16" in length.

For a one-ton clamp the shank dimensions were essentially the same as those given above, except that a 5° slope was used at 58. The head had a diameter of 1" and a thickness of 1/4".

Gripping pads for 3 and 4 ton clamps had a head diameter of 1.437", a head thickness of 0.375" and a shank 3/4" in length. The shank diameter at the area 54 was 0.483, while that at 50 and 52 was 0.432. The bores 40 for these clamps was 29/64".

The gripping pads according to the invention are made by turning them from steel, carburizing the turned pads and then heat treating them. These pads may be provided as accessories and are readily driven into a clamp by men on the field, so that worn pads are readily replaced. The old worn pad is simply driven out by a hand hammer and driving pin and a new one is driven in in the same manner. These pads are more securely held than with a bolt and more easily replaced than a rivet and much less expensive to manufacture. A small wedging angle is provided on the tapered knob of the shank, so that one is able to stretch the steel rivets of the clamp when the pad is driven in. By the time the head of the pad is seated in its counterbore, the knob is held slightly short of the end of the hole 40, so that the edge of the hole is actually crushed by the rivets which have been stretched. These rivets are elastic and bring terrific pressures against the inner edges of the knob on the shank and the sharp edges of the hole in the side plates. The result is that the edges of the hole crush allowing the side plates to come together again. In this condition, as illustrated in FIG. 4, the hole 40 is then smaller than the knob 60, so that it takes considerable force to drive the knob backwards out of the hole, since the elastic rivets must be stretched again in order to remove a worn gripping pad. The improved drive gripping pads may be used in any clamp where the structure comprises side plates held together by elastic metal rivets, or clamps of equivalent structure.

I claim:

1. In a lifting clamp for engaging and lifting heavy articles such as steel plates and the like including a clamp body comprising a pair of similarly shaped plates riveted together face-to-face to form the clamp body, a pair of spaced facing jaws each including portions of said plates and between which the article to be lifted is held by the clamp, one of said jaws being provided with a bore facing toward the other jaw and located partly in each of the riveted plates and parallel to the engaging surfaces of the plates, and a gripping pad having a head provided with a serrated gripping surface and a shank projecting from the side of the head opposite its serrated surface and extending into said bore, the improvement in which said gripping pad is a drive-in pad the shank of which includes a knob slightly larger in diameter than the diameter of the bore which, when the shank of the pad is driven into the bore spreads the portions of the riveted plates at the location of the bore so that the plates grip the knob and hold the pad firmly to the jaw.

2. A lifting clamp as claimed in claim 1, in which the pair of similarly-shaped steel plates of the clamp are secured together in the vicinity of said bore by an elastic stretchable rivet which is stretched when the knob of the gripping pad spreads the portions of the plates at the location of the bore.

3. A clamp as claimed in claim 1, in which the length of the shank from the head to the maximum diameter of the knob is about the same as the length of the bore.

4. A clamp as claimed in claim 3, in which a small part of the knob nearest the head is in the extreme outer end of the bore, the shank is harder than the riveted plates and the edge of the bore engaging the knob is crushed, whereby the riveted plates come together after the pad is in place.

5. In a lifting clamp for engaging and lifting heavy articles such as steel plates and the like including a clamp body comprising a pair of similarly shaped plates riveted together face-to-face to form the clamp body, a pair of spaced facing jaws each including portions of said plates and between which the article to be lifted is held by the clamp, one of said jaws being provided with a bore facing toward the other jaw and located partly in each of the riveted plates and parallel to the engaging surfaces of the plates, and a gripping pad having a head provided with a serrated gripping surface and a shank projecting from the side of the head opposite its serrated surface and extending into said bore, the improvement in which said gripping pad is a drive-in pad having a shank which includes a knob, intermediate its ends of slightly larger diameter than the diameter of the bore which knob, when the shank of the pad is driven into the bore, spreads the portions of the riveted plates at the location of the bore, said gripping pad being of hardened steel harder than that of said plates, and the small part of the knob nearest the head, when the pad is in place, is in the extreme outer end of the bore the outer edge of which engaging the knob is crushed by the stress in the plates.

References Cited in the file of this patent

UNITED STATES PATENTS

| | | |
|---|---|---|
| 2,212,754 | Smith | Aug. 27, 1940 |
| 2,289,873 | Claud-Mantle | July 14, 1942 |
| 2,326,962 | Meier | Aug. 17, 1943 |
| 2,360,366 | Renfroe | Oct. 17, 1944 |
| 2,446,610 | Renfroe | Aug. 10, 1948 |
| 2,500,694 | Matsumoto | Mar. 14, 1950 |
| 2,644,213 | Bedford | July 7, 1953 |
| 2,647,007 | Gmoser et al. | July 28, 1953 |
| 2,732,083 | Smith | Jan. 24, 1956 |
| 2,824,464 | Remington | Feb. 25, 1958 |
| 2,852,300 | Gardener | Sept. 16, 1958 |
| 2,916,321 | Renfroe | Dec. 8, 1959 |